(12) United States Patent
Lehman et al.

(10) Patent No.: US 10,965,526 B2
(45) Date of Patent: Mar. 30, 2021

(54) SYSTEM AND METHOD FOR AUTOMATIC TRANSPORT CONNECTION OF A NETWORK ELEMENT

(71) Applicant: Level 3 Communications, LLC, Broomfield, CO (US)

(72) Inventors: Bernie C. Lehman, Aurora, CO (US); James M. Adkins, III, Elizabeth, CO (US); Kevin J. Bennett, Firestone, CO (US)

(73) Assignee: Level 3 Communications, LLC, Broomfield, CO (US)

(*) Notice: Subject to any disclaimer, the term of this patent is extended or adjusted under 35 U.S.C. 154(b) by 162 days.

(21) Appl. No.: 15/349,684

(22) Filed: Nov. 11, 2016

(65) Prior Publication Data

US 2017/0207959 A1    Jul. 20, 2017

Related U.S. Application Data

(60) Provisional application No. 62/280,974, filed on Jan. 20, 2016.

(51) Int. Cl.
*H04L 12/24*    (2006.01)
*H04L 12/26*    (2006.01)
*H04L 12/933*   (2013.01)

(52) U.S. Cl.
CPC ...... *H04L 41/0806* (2013.01); *H04L 41/0686* (2013.01); *H04L 41/0853* (2013.01); *H04L 43/0811* (2013.01); *H04L 49/101* (2013.01)

(58) Field of Classification Search
CPC .............. H04L 41/0806; H04L 49/101; H04L 43/0811; H04L 41/0686; H04L 41/0853
See application file for complete search history.

(56) References Cited

U.S. PATENT DOCUMENTS

| | | | | |
|---|---|---|---|---|
| 6,157,634 A | * | 12/2000 | Mehta | H04Q 11/04 370/351 |
| 6,516,456 B1 | * | 2/2003 | Garnett | G06F 30/392 716/119 |
| 9,704,094 B2 | * | 7/2017 | Amir | G06N 3/049 |
| 9,965,581 B1 | * | 5/2018 | Das | G06F 30/327 |

(Continued)

OTHER PUBLICATIONS

International Search Report dated Jan. 25, 2017, Int'l Appl. No. PCT/US16/061621, Int'l Filing Date Nov. 11, 2016; 3 pgs.

(Continued)

*Primary Examiner* — Christine Ng

(57) ABSTRACT

Systems and methods are provided for configuring a Network Element (NE) to transport data within a network. A system configured accordingly may include a Transport Automation Tool (TAT) which can initiate, at a server on a network, a communication channel with a NE on the network. The TAT can determine or receive a network plan providing information about a circuit to be initiated or decommissioned on the network. The network plan may include a first port on the NE which is to be connected via a cross-connect (or disconnected) to a second port on the NE. The TAT can then establish or remove, using the communication channel, the cross-connect on the NE such that the NE is added to or removed from a circuit design utilizing the NE as a transport NE within the circuit.

20 Claims, 8 Drawing Sheets

(56) References Cited

U.S. PATENT DOCUMENTS

| | | | | |
|---|---|---|---|---|
| 2003/0189919 A1* | 10/2003 | Gupta | .................... | H04L 41/12 |
| | | | | 370/351 |
| 2005/0013259 A1* | 1/2005 | Papoushado | ........ | H04L 41/0866 |
| | | | | 370/254 |
| 2007/0118643 A1 | 5/2007 | Mishra et al. | | |
| 2008/0175154 A1* | 7/2008 | Ong | .................... | H04L 41/0806 |
| | | | | 370/236 |
| 2011/0122776 A1 | 5/2011 | Jacob et al. | | |
| 2012/0308225 A1* | 12/2012 | Long | .................. | H04J 14/0267 |
| | | | | 398/13 |
| 2012/0324105 A1 | 12/2012 | Wall et al. | | |
| 2015/0171768 A1* | 6/2015 | Perreault | ................. | H03F 3/245 |
| | | | | 330/251 |

OTHER PUBLICATIONS

Written Opinion of the International Searching Authority dated Jan. 25, 2017, Int'l Appl. No. PCT/US16/061621, Int'l Filing Date Nov. 11, 2016; 5 pgs.

International Preliminary Report on Patentability, dated Jul. 24, 2018, Int'l Appl. No. PCT/US16/061621, Int'l Filing Date Nov. 11, 2016; 7 pgs.

* cited by examiner

SYSTEM AND METHOD FOR AUTOMATIC TRANSPORT CONNECTION OF A NETWORK ELEMENT

CROSS-REFERENCE TO RELATED APPLICATION

This application is related to and claims priority under 35 U.S. § 119(e) from U.S. Patent Application No. 62/280,974, filed Jan. 20, 2016, titled "TRANSPORT AUTOMATION," the entire contents of which are incorporated herein by reference for all purposes.

BACKGROUND

1. Technical Field

The present disclosure relates to automatically generating connections within a network element of a telecommunications network.

2. Introduction

Computer networks are formed by linking together computers, servers, other computing equipment using networking elements to transport the data on the network. While some networking elements (such as routers and switches) have many ports through which they can transport data, other networking elements may only have a single input port and a single output port. However, regardless of the size and complexity of the network elements being used to transport data in the network, configuring the network elements to carry correctly carry traffic can be a difficult and time-consuming process.

Typically, a customer connected to the network requests one or more services from the network. Providing these services often requires configuring one or more network elements to carry traffic related to the services to and from the customer's network. A network engineer will often create a circuit design that is to be implemented on the network devices that connects the user's network to the telecommunications network to begin receiving the requested services. This circuit design is then implemented in the network by a technician connecting or otherwise configuring the network elements (NEs) together per the design.

Similarly, sometimes the overall plan and configuration of the network changes, which in turn forces updates and changes to the NEs. When these network updates occur, any individual switch, router, or other NE affected by the change must be individually updated.

While the amount of human time spent configuring NEs to transport data on the network per a circuit design can be substantial, it does not necessarily lead to higher quality or fewer configuration errors. Instead, errors are often introduced into the overall system by requiring so much human interaction. The present disclosure addresses these and other deficiencies in the current commissioning process.

SUMMARY

Disclosed are systems, methods, and non-computer-readable storage media for automatically connecting ports within a network element of a telecommunications network. The systems and methods may include the operations of retrieving a circuit design of a telecommunications network from an Inventory Service (IS) database, decomposing the circuit design to obtain an identification of a network element of the telecommunications network included in the circuit design, and requesting operational information from the network element. Once obtained, the operational information is stored in a localized database, with the operational information from the network element including an operational configuration and operational state of a plurality of communication ports of the network element. Finally, the systems and methods may establish a cross-connect on the network element between a first port and a second port of the plurality of communication ports based on the circuit design.

DETAILED DESCRIPTION

Disclosed are systems, methods, and non-transitory computer-readable storage media for configuring a Network Element (NE) to transport data within a network (i.e., cross-connecting ports within an NE so that the NE may transport traffic). For example, a system configured according to this disclosure can be a Transport Automation Tool (TAT) which can initiate, at a server on a network, a communication channel with a NE on the network. The TAT can determine or receive a network plan providing information about a circuit to be initiated or decommissioned on the network. The network plan may include a first port on the NE which is to be connected via a cross-connect to a second port on the NE. In another example, the network plan may include a first port on the NE which is to be disconnected from a second port on the NE. The TAT can then establish or remove, using the communication channel, the cross-connect on the NE such that the NE is added to or removed from a circuit design utilizing the NE as a transport NE within the circuit.

In a first example, services provided to a customer of a telecommunications network may include establishing one or more cross-connects of ports of an NE of the network. A circuit design plan is thus created that includes information on which ports and which NEs of the network are to be connected. The circuit design plan is provided to the TAT for automatic connecting of the ports. In particular, the TAT may obtain the design plan and determine which NEs and ports are included in the design plan. The TAT may then obtain information from the affected NEs and begin the process of automatically cross-connecting the ports of the NEs to establish the circuit design plan on the network. In some instances, one or more of the cross-connects cannot be completed due to a current state of a port of NE of the circuit plan. A service request or alarm may be generated by the TAT to alert a network technician of the failure of the TAT to complete the requested cross-connecting of the ports.

In a second example, a network circuit design may include disconnecting one or more ports of a NE of the telecommunications network. In a similar manner as above, the TAT may obtain the design plan and information from the affected NEs to begin the disconnect process of the connected ports. In some instances, the disconnection of the ports also includes a de-configuring of the port to place one or more of the ports out-of-service, per the circuit design plan obtained by the TAT.

Figure 1A:
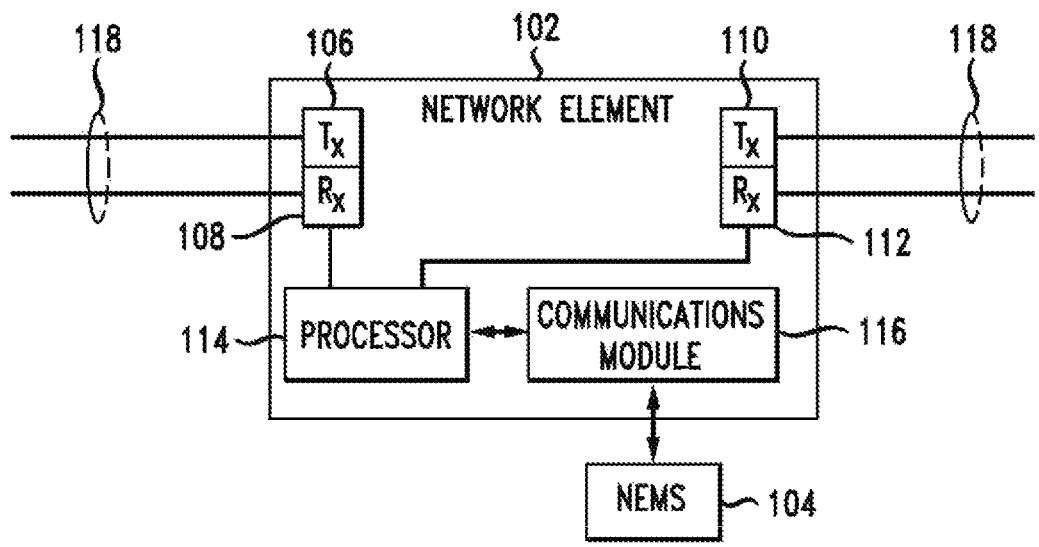
FIG. 1A illustrates an example network element which has not yet been configured to carry traffic on a network.

FIG. 1A illustrates an example NE 102 that includes two ports that are to be connected based on a circuit design of a telecommunications network. In general, the NE 102 is physically connected to a network with wires (or cables) 118, which connect to specific ports on the NE 102. In this example, two ports are illustrated—one on the left, having Tx 106 and Rx 108 components, and one on the right having similar Tx 110 and Rx 112 components. In this illustration, each respective pair of Tx/Rx components form a single port, with the Tx components 106, 110 transmitting data away from the NE 102 and the Rx components 108, 112 receiving data at the NE 102. This is exemplary only. In reality ports can contain multiple pins and connections used for transmitting and/or receiving data.

Each port in the NE 102 is connected to a processor 114 (or other integrated circuit), which in turn is connected to a communications module 116. As data is received or transmitted on the ports, the processor 114 can report the traffic to the communications module 116, which in turn can forward the data to a NEMS (Network Element Management System) 104. The NEMS 104 is a networking tool which allows for monitoring of NEs in a network by collecting data from the NEs, aggregating the data, and presenting the compiled data in an understandable manner. While each NEMS 104 can vary, communication with thousands of NEs in the network would not be unusual. Thus, the NEMS 104 can monitor the flow of traffic across NEs and configure the NEs to allow transporting of data or packets across the network.

As shown in FIG. 1A, the NE 102 is not configured to transport data on the network. For example, no connection is present from the left Rx component 108 to any other communication component in the NE 102, and likewise the right Rx component 112 has no connection. Therefore, any data received by the NE 102 at either Rx component 108, 112 will not be passed on to a further destination. In addition, the Tx components 106, 110 are not connected to a data source, resulting in the NE 102 of FIG. 1A not being capable of transmitting data.

Figure 1B:
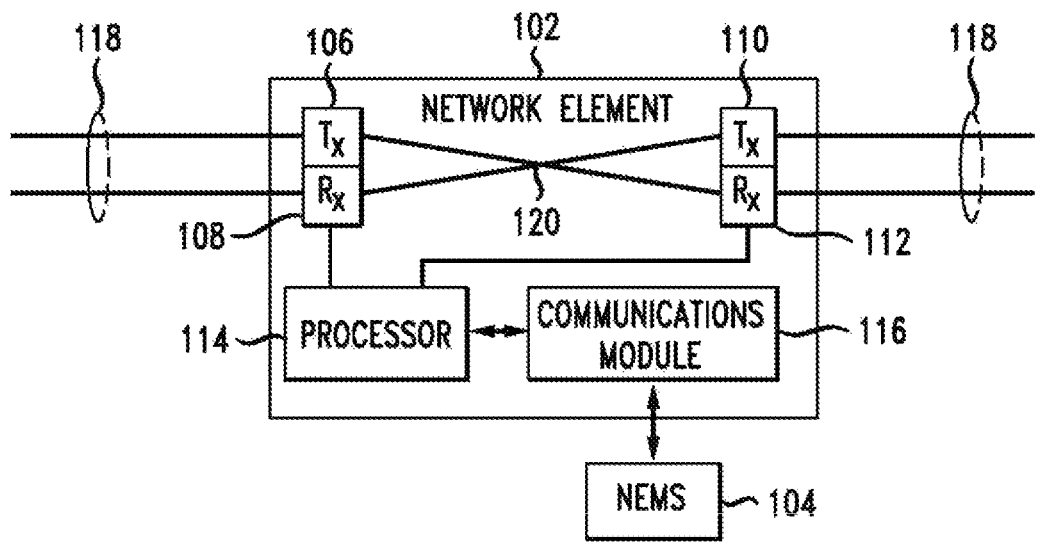
FIG. 1B illustrates the network element of FIG. 1A with a cross-connect allowing network traffic to flow between ports.

FIG. 1B illustrates the same network element 102 of FIG. 1A with the addition a cross-connect 120. The cross-connect allows network traffic to flow between ports by passing data received on the left port at Rx component 108 to the right port at Tx component 110. Similarly, data received on the right port at Rx component 112 is passed to the left port Tx component 106. This allows data received by the network element 102 to be forwarded to designated destinations, with the ports of the NE 102 of FIG. 1B being described as a "connected" such that the NE may operate as a transport network element.

Figure 2:
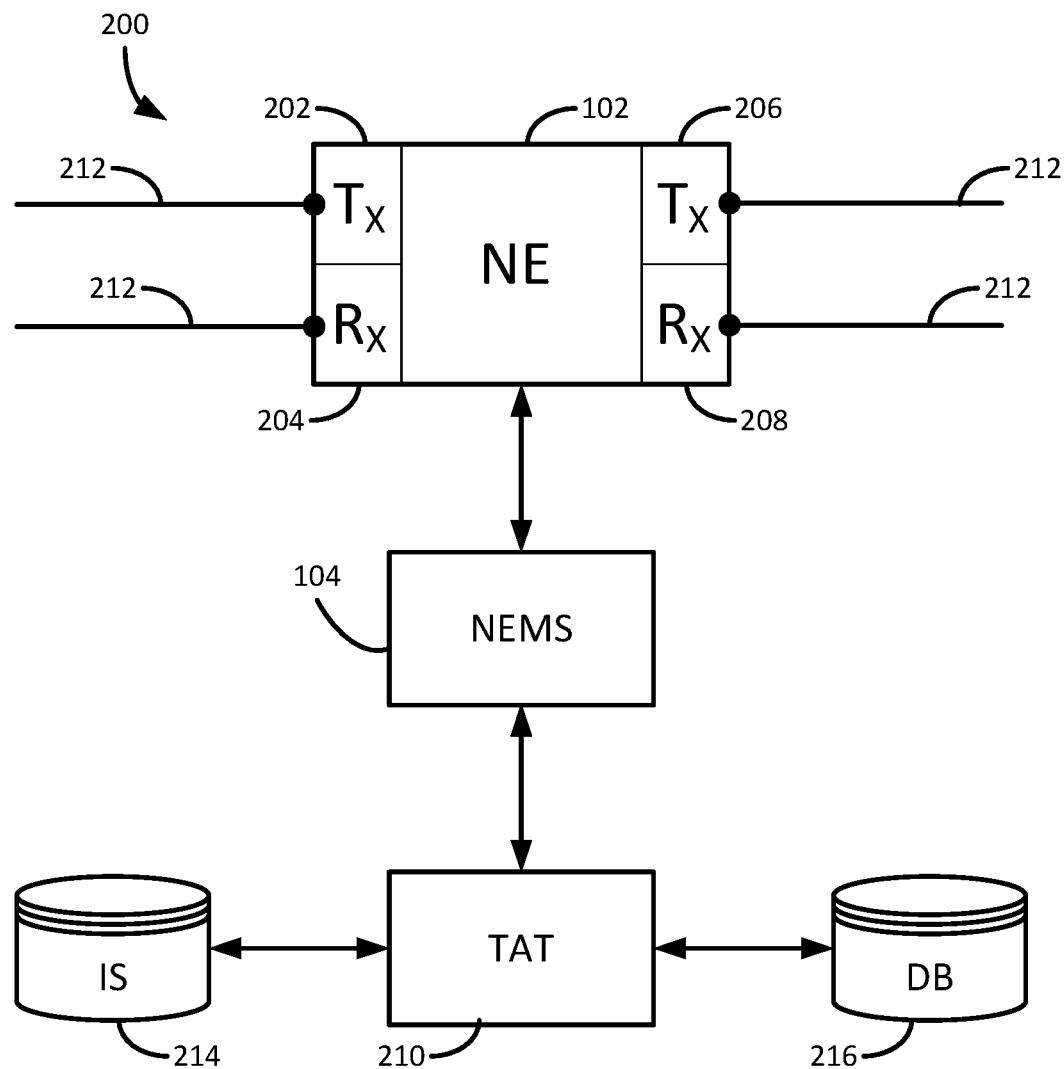
FIG. 2 illustrates a first example system architecture.

FIG. 2 illustrates an example system architecture for utilizing a TAT to connect or disconnect ports of a NE as part of a circuit design of a telecommunications network. Such an architecture can, for example, be used to connect two T1 ports of a NE. In this architecture, a NE 102 is in communication with the NEMS 104, which in turn is in communication with the Transport Automation Tool (TAT) 210. The NE 102 in this example has two ports, each made of respective transport and receive elements, similar to that illustrated in FIGS. 1A and 1B and discussed above. As illustrated, the left port (Tx component 202 and Rx component 204) is connected to respective data lines 212 and the right port (Tx component 206 and Rx component 208) is similarly connected to respective data lines 212. Although not illustrated in FIG. 2, it should be appreciated that the left port (202, 204) may or may not be electronically connected to the right port (206, 208) using a cross-connect 120, thereby allowing data to be transported from port to port.

To connect or disconnect the ports of the NE 102 based on a circuit design, the TAT 210 contacts the NEMS 104 to obtain information about the NE and the state or configuration of the ports of the NE. The TAT 210 may also be in communication with (or contain) a database/Information System (IS) 214 containing a copy of the circuit design plan of the network. This network plan can identify which NEs on the network are connected to one another, which ports on the respective NEs are used for the communications, which NEs on the network are intended to be connected or disconnected to one another based on a future plan, where cross-connects 120 should exist on individual NEs to connect respective ports, etc. The TAT 210 also communicates with (or contains) a database 216 which can be used during connecting or disconnecting ports per the circuit design to store information of the NEs and ports included in the connection or disconnection activity.

While FIG. 2A illustrates the NEMS 104 and the TAT 210 as being separate tools or operational blocks, it is noted that the TAT may be implemented as one or more operational routines of a hardware device with computer executable instructions to perform the routines. The hardware device may be a server, a personal computer, a tablet, or collection or distribution of such devices. The routines may also be implemented in hardware or firmware. From a functionality standpoint, the NEMS 104 may monitor and communicate with many NEs, whereas the TAT 210 is primarily focused on automatically connecting or disconnecting ports of one or more NEs of the network. However, a NEMS 104 configured to perform the functionality of the TAT 210 is within the scope of this disclosure, or vice versa. Similarly, databases, such as the firmware database 214 or a software database, may be remotely located from the TAT 210 as separate databases, or may be contained in either the NEMS 106 or the TAT.

Figure 3:
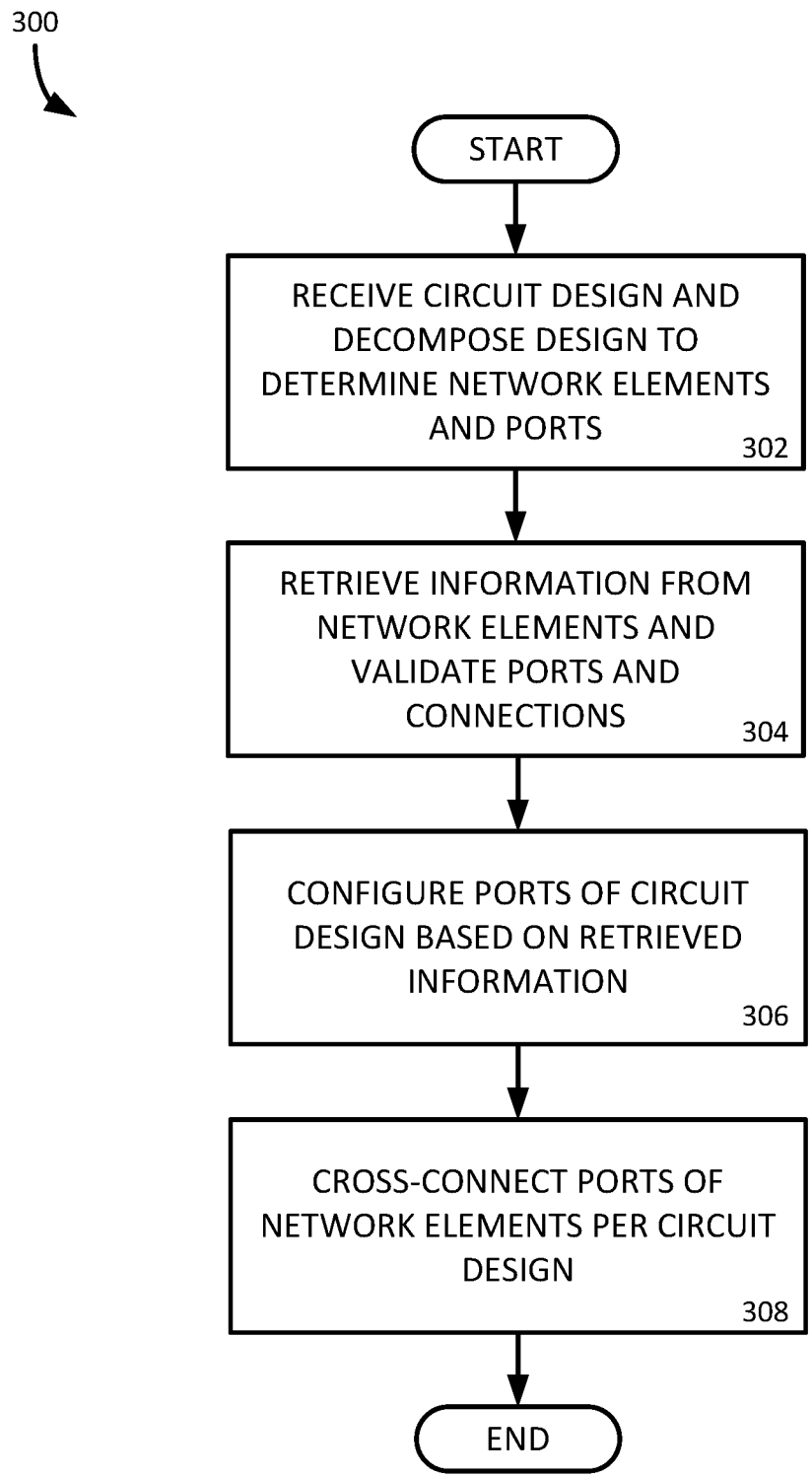
FIG. 3 illustrates a first example flowchart for automatically connecting ports within a network element based on a circuit plan.

FIG. 3 illustrates a first example flowchart for automatically connecting ports within a network element based on a circuit plan. In one embodiment, the operations of the method 300 of FIG. 3 are performed by the TAT 210. However, in other embodiments, one or more of the operations may be performed by any component or a combination of components of the telecommunications network. For example, the NEMS 104 may perform one or more of the operations of the method 300. Further, the operations may be performed through hardware circuits of components, executed software instructions, or a combination of both hardware and software components.

Beginning in operation 302, the TAT 210 receives or obtains a telecommunications circuit design. In one instance, the circuit design may be provided by a network engineer in response to a request for providing services to one or more customers of the network. Once prepared, the circuit design may be stored in a database, such as the IS 214 database of FIG. 2. Thus, the TAT 210 may obtain the circuit design from the IS 214 once stored. In addition to obtaining the circuit design, the TAT 210 may also decompose the circuit design to determine the NEs and ports included in the circuit design. For example, TAT 210 may determine that NE 102, a first port 202,204, and a second port 206, 208 are included in the circuit design. In one example, the first port and the second port are to be cross-connected based on the circuit plan. In another example, the first port and the second port are to be disconnected from each other.

In operation 304, the TAT 210 retrieves network information from the network elements and ports of included in the circuit design. In particular, through the decomposition process described above, the TAT 210 determines which network elements and ports are included in the circuit design. With this information, the TAT 210 may contact one or more of the NEs 102 included in the plan to obtain information concerning operating status or states of the NEs. For example, the TAT 210 may contact an NE 102 of the circuit design to obtain a listing of the transmission ports of the NE 102, a state of the ports of the NE, a configuration state of the NE, identification information of the NE, and the like. In general, any operating or other information concerning a NE of a telecommunications network may be obtained by the TAT 210.

As mentioned, information concerning the transmission ports of an NE 102 may be obtained during the decomposition of the circuit design. Such transmission port information may include port configuration information, rate level of the ports, and connection information describing which ports of the NE are connected to which other ports of the NE or the telecommunications network. Further, as explained in more detail below, the port configurations and connections between the ports may be validated by the TAT 210 to further execute the circuit design on the NEs and ports included in the design.

In operation 306, the TAT 210 configures one or more of the ports of the identified NEs based at least on the retrieved circuit plan. The configuration of the ports allows for the included ports to be connected per the circuit design. Once configured per the circuit design, the TAT 210 may then cross-connect ports of the affected NEs in operation 308 to convert the NE 102 into a transport device in accordance with the circuit design. Communications between the identified NEs 102 may now occur in accordance with the circuit design to provide services to one or more customers of the network. Further, such connections may occur automatically through the TAT 210 without the need for a technician to manually connect the ports and execute the circuit plan.

Figure 4A:
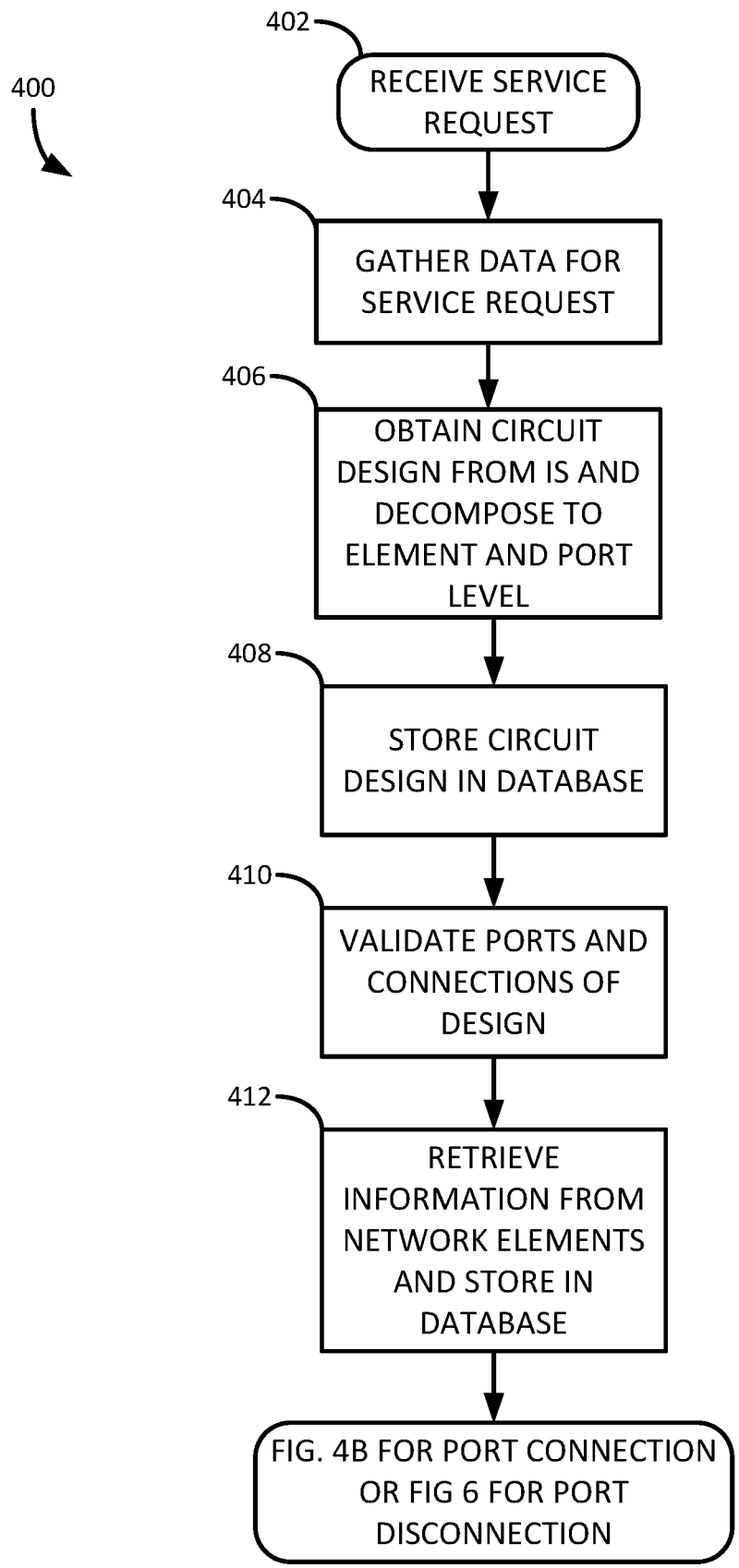
FIGS. 4A and 4B illustrates a second example flowchart for automatically connecting ports within a network element based on a circuit plan.
Figure 4B:
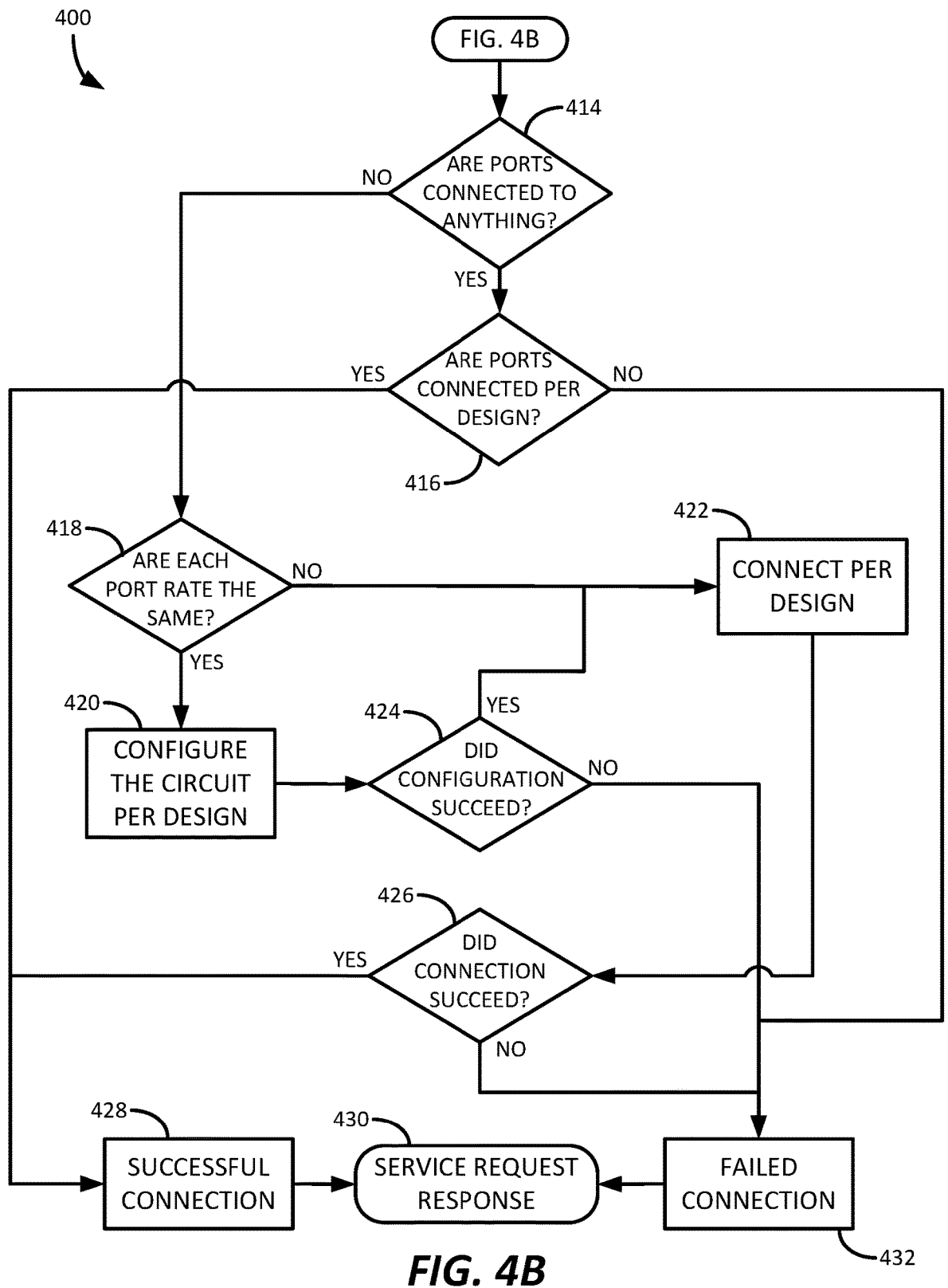

FIGS. 4A and 4B illustrate a more detailed example flowchart for automatically connecting ports within a network element based on a circuit plan or design. Thus, similar to the method 300 of FIG. 3, the operations of the method 400 of FIGS. 4A and 4B may be performed by the TAT 210, the NEMS 104, a combination of the TAT 210 and the NEMS 104, or a combination of any number of telecommunication devices in the network. Further, the operations of the method 400 provide more detail into the operations of the method 300 described above.

Beginning in operation 402, a request for service is received at a network or network administrator to provide one or more telecommunication services to a customer of the network. In one embodiment, the TAT 210 receives some indication of the service request from the network administrator to automatically begin connecting ports utilized in providing the service. In operation 404, data for the service request is gathered. For example, the service request for the customer may include particular types of NEs located in particular geographic regions to provide the requested services. The information necessary to provide the requested services to the customer may thus be gathered so that a circuit design of NEs may be created.

With the data gathered, a network engineer may create a circuit design that utilizes one or more NEs of the telecommunications network. The circuit design may include any number and types of NEs interconnected in any manner. Those of ordinary skill in the art will understand the various types of circuit designs that may be utilized to provide requested services to customers of the network. Once prepared, the circuit design may be stored in IS database 214. Thus, in operation 406, the TAT 210 obtains the circuit design from the IS database 214. Also, the TAT 210 may decompose the circuit design to determine which NEs 102 and ports are to be configured or otherwise included in the circuit design. In one particular implementation, each NE 102 in the circuit design is identified by a $T_x$ value and each port of a particular NE is identified by an $A_x$ value. Thus a particular port in the circuit design may be identified by noting the particular NE including the port and the particular port number within the identified NE. For example, an identifier of $T_1A_1$ indicates a first port on a first NE 102 of the circuit. In general, however, any identifying scheme may be utilized to identify the NEs 102 and or ports of the designed circuit.

In operation 408, the TAT 210 stores the decomposed circuit design and other circuit information in a transport automation database 216. The database 216 is utilized to store and obtain information of the services, configurations, NEs 102, and ports used in the circuit design. In operation 410, the TAT 210 validates the ports and connections that are included in the circuit design. To validate the ports and connections, the TAT 210 may utilize the NEMS 104 to retrieve information from the NEs 102 included in the circuit design in operation 412. In particular, the TAT 210 communicates with the included NEs 102 to obtain state information of the NE, port connectivity information, configuration information of the NE and the ports, and any other information concerning the NE and interconnectivity of the ports of the circuit design. During validation of the ports, the TAT 210 determines whether the ports are grown, the transmission rate of the ports, the configuration of the ports, any current connectivity information of the ports (such as if the ports are connected and to which other ports the connections are to), and the like. As discussed in more detail below, this information is used during the connection process of one or more ports of the circuit design.

Through an analysis of the circuit design, the TAT 210 may determine that the design calls for cross-connecting ports of a particular NE 102. For example, the circuit may include cross-connecting port $T_1A_1$ to port $T_1A_2$ for NE 102 identified as $T_1$. The TAT 210 may then begin the process of automatically cross-connecting the ports of the NE 102 based on the circuit design through the operations illustrated in FIG. 4B. Although discussed below with relation to the connection of two ports of a NE, it should be appreciated that the operations of FIG. 4B may be performed for any number of ports of the circuit design to connect those circuits for transporting of communications between the ports.

Beginning in operation 414, the TAT 210, utilizing the information stored in the database 216, determines if the ports to be connected are already connected. If yes, the TAT 210 determines if the ports are connected per the circuit design in operation 416. For example, the information stored in the database 216 may indicate that port $T_1A_1$ is already cross-connected to port $T_1A_2$ of the particular NE 102. In such a situation, the TAT 210 determines that the cross-connecting of the ports of the NE 102 is successful (operation 428) per the circuit design. A response to the request for the service is also generated and sent by the TAT 210 in operation 430 indicating the success of the connection of the ports.

If the TAT 210 determines that the ports to be connected per the circuit design are already connected to other ports, the TAT determines that the cross-connecting of the ports of the NE 102 failed (operation 432) per the circuit design. For example, the information stored in the database 216 may indicate that port $T_1A_1$ is cross-connected to port $T_1A_4$ of the particular NE 102, which is counter to the circuit design. In this circumstance, the TAT 210 may fail the connection of the ports so as to not disrupt any current traffic being carried on the ports of the NE 102. A service request response 430 and additional request to a technician to fix the incorrectly connected ports may be generated by the TAT 210 and provided to a network administrator.

Returning to operation 414, the TAT 210 may utilize the information stored in the database 216 to determine that the ports to be connected per the design are not currently connected to any other port. If not currently connected, the TAT 210 determines the transmission rate of the ports involved in the connection in operation 418. In general, the port rate is the rate at which bits may pass through the port. In one example, the port rate of a port may be T1. In another example, the port rate may be configured as a T3 rate, which comprises 28 T1 lines. Those of ordinary skill in the art will recognize the various transmission rates of ports included in NEs 102. During this operation, the TAT 210 determines if the port rate of the two ports to be connected are the same. Continuing the example above, the TAT 210 determines if the port rate of $T_1A_1$ is the same as the port rate of $T_1A_2$. If the port rates of the ports are the same, the TAT 210 transmits one or more instructions to the NE 102 to configure the ports per the circuit design in operation 420. Configuring the port may place the ports into a "in service" state that allows for traffic to be carried on the port. In general, any aspect of a port configuration may be established by the TAT 210.

In operation 424, the TAT 210 determines if the configuration of the ports was successful. If not, the connection of the ports failed (operation 432). However, if the configuration is successful or the TAT 210, the TAT 210 connects the two ports in operation 422 per the circuit design. Further, if the TAT 210 determines that the port rate of the ports is not the same, the TAT may attempt to connect the ports in operation 422. For example, it may be the case that a first port is already configured as a T3 port while a second port is configured as a T1 port. Thus, the ports may be connected, but do not need to be configured to the same port rate. In this example, the TAT 210 may connect the ports per the circuit design. In operation 426, the TAT 210 determines if the connection of the ports is successful and indicates success (operation 428) or failure (operation 432) accordingly. Through this method 400, the TAT 210 may automatically cross-connect one or more ports of one or more NEs 102 of a network in response to a circuit design to provide services to customers of the network.

Figure 5:
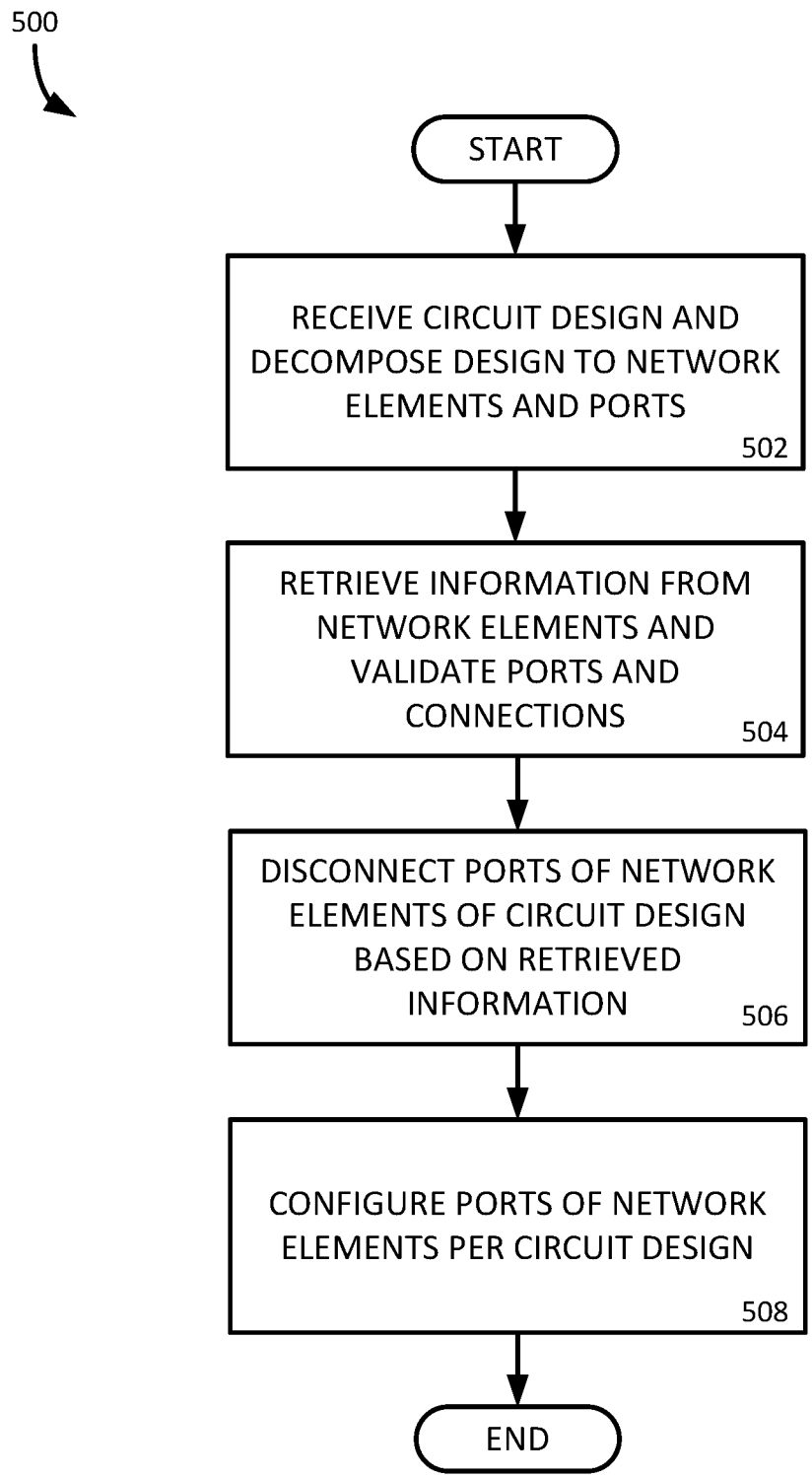
FIG. 5 illustrates a first example flowchart for automatically disconnecting ports within a network element based on a circuit plan.

In a similar manner, the TAT 210 may automatically disconnect ports based on a received circuit design. FIG. 5 illustrates a first example flowchart for automatically disconnecting ports within a network element based on a circuit plan. Many of the operations of the method 500 of FIG. 5 are similar to those operations discussed above. For example and beginning in operation 502, the TAT 210 receives or obtains a telecommunications circuit design based on providing services to a customer of the network. The TAT 210 may obtain the circuit design from the IS 214 once stored by the network engineer. In addition to obtaining the circuit design, the TAT 210 may also decompose the circuit design to determine the NEs and ports included in the circuit design, as described above.

In operation 504, the TAT 210 retrieves network information from the network elements and ports of included in the circuit design. In particular, through the decomposition process described above, the TAT 210 determines which network elements and ports are included in the circuit design. With this information, the TAT 210 may contact one or more of the NEs 102 included in the plan to obtain information concerning operating status or states of the NEs.

In operation 506, the TAT 210 automatically disconnects one or more of the ports of the circuit per the circuit design obtained above. Such disconnection of ports may include removing one or more cross-connects between the affected ports. Further, in operation 508, the TAT 210 configures one or more of the ports of the identified NEs based at least on the retrieved circuit plan to indicate that the ports are not connected to any other port. In one particular example, the configuring of the ports includes placing the ports in an "out of service" state so that the network is aware that no traffic may be transmitted through the ports until the ports are placed back into service.

Figure 6:
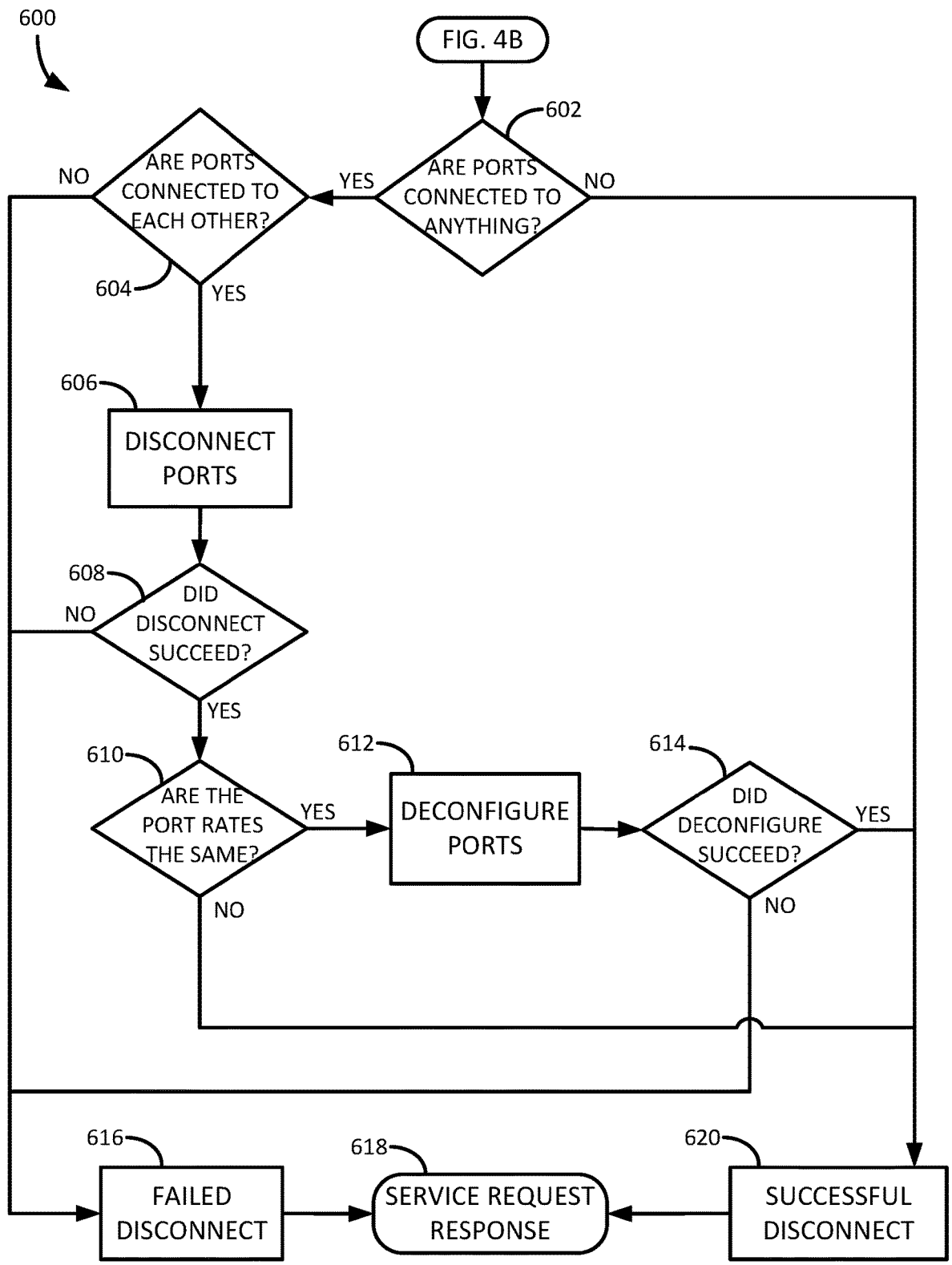
FIG. 6 illustrates a second example flowchart for automatically disconnecting ports within a network element based on a circuit plan.

FIG. 6 illustrates a more detailed example flowchart for automatically disconnecting ports within a network element based on a circuit plan. In particular, the method 600 includes the same or similar operations described above with relation to FIG. 4A. Thus, to disconnect ports, the TAT 210 may receive a service request (operation 402), gather data for the service request (operation 404), obtain and decompose a circuit design from the IS database (operation 406), store the circuit design in the database (operation 408), validate the ports and connections of the circuit design (operation 410), and access one or more NEs 102 of the circuit design to obtain information that is stored in the database 216. With this information stored in the database 216, the TAT 210 may begin to automatically disconnect one or more of the connections as called for in the circuit design.

Beginning in operation 602 of FIG. 6, the TAT 210 determines if the ports to be disconnected are connected to anything. In one implementation, the TAT 210 utilizes the information stored in the database 216 of circuit information to determine the connection information for the ports. If the ports are already disconnected (or not connected to anything), the TAT 210 may consider the disconnection of the ports successful in operation 620. However, if the ports are connected, the TAT 210 determines if the ports are connected to each other in operation 604. For example, the ports may be connected to other ports that do not match the circuit design calling for the ports to the disconnected. In such a situation where the affected ports are not connected to each other, the TAT 210 may consider the disconnect operation failed in operation 616. In one embodiment, a service call may be generated by the TAT 210 to a network technician to fix the NE 102 as the actual port connection is the not the same as the circuit design. Regardless of a failed disconnect or successful disconnect, a service request response may be generated and transmitted to a network administrator in operation 618.

Assuming that the affected ports are connected to each other, the TAT 210 may disconnect the ports in operation 606. The disconnecting of the ports may include the TAT 210 providing a disconnect instruction to the NE 102 to remove the cross-connect between the ports. In operation 608, the TAT 210 determines if the disconnection of the ports was successful. If not, the disconnect operation failed in operation 616. If successful, the TAT 210 may then determine if the port rate of the disconnected ports is the same in operation 610. If the port rates are not the same, the TAT 210 may consider the disconnect operation successful in operation 620 and respond to the service request accordingly (operation 618).

However, in some instances, the TAT 210 may also reconfigure the ports or otherwise place the ports out of service. For example, if the port rates of the ports are the same, the TAT 210 may deconfigure the ports in operation 612. Deconfiguration of the ports may include altering an operational state of the ports into an out of service state. In operation 614, the TAT 210 determines if the deconfiguration is successful. If successful, the disconnecting of the ports is successful in operation 620. If the deconfiguration failed, the TAT 210 may fail the disconnect operation of the ports in operation 616. Thus, through the operations of the method 600 of FIG. 6, the TAT 210 may automatically disconnect connected ports based on a circuit design provided to the TAT.

Through the systems and methods described above, the TAT 210 may automatically connect or disconnect ports of an NE 102 of a telecommunications network per a circuit design. Such automation of the connecting of the ports may occur to provide services to a customer of the network without a field technician to physically interact with the included NEs of the circuit design to create the circuit.

Figure 7:
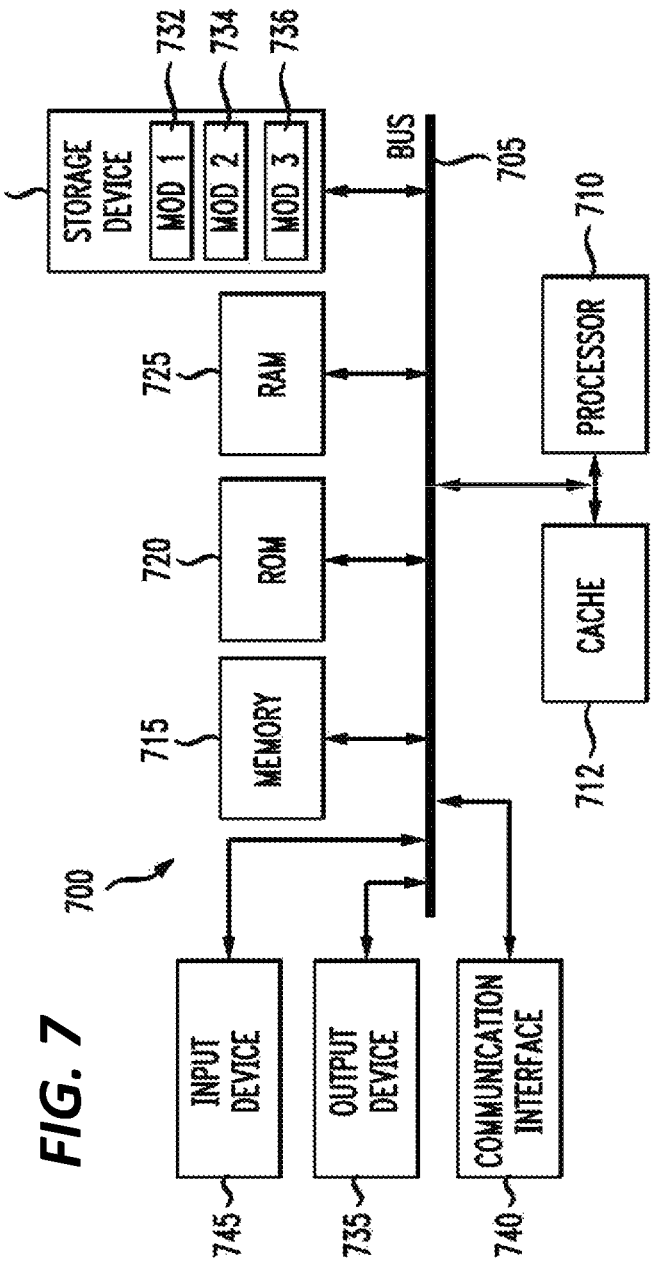
FIG. 7 illustrates an exemplary system embodiment.

Having discussed a system configured to perform the concepts and principles disclosed herein, the disclosure now turns a description of a computing system which can be employed by any of the devices referenced herein. With reference to FIG. 7, an exemplary system 700 includes a general-purpose computing device 700, including a processing unit (CPU or processor) 710 and a system bus 705 that couples various system components including the system memory 715 such as read only memory (ROM) 720 and random access memory (RAM) 725 to the processor 710. The system 700 can include a cache 712 of high speed memory connected directly with, in close proximity to, or integrated as part of the processor 710. The system 700 copies data from the memory 715 and/or the storage device 730 to the cache 712 for quick access by the processor 710. In this way, the cache 712 provides a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. It can be appreciated that the disclosure may operate on a computing device 700 with more than one processor 710 or on a group or cluster of computing devices networked together to provide greater processing capability. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

The system bus 705 may be any of several types of bus structures including a memory bus or memory controller, a peripheral bus, and a local bus using any of a variety of bus architectures. A basic input/output (BIOS) stored in ROM 720 or the like, may provide the basic routine that helps to transfer information between elements within the computing device 700, such as during start-up. The computing device 700 further includes storage devices 730 such as a hard disk drive, a magnetic disk drive, an optical disk drive, tape drive or the like. The storage device 730 can include software modules 732, 734, 736 for controlling the processor 710. Other hardware or software modules are contemplated. The storage device 730 is connected to the system bus 705 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 710, bus 705, display 735, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 700 is a small, handheld computing device, a desktop computer, or a computer server.

Although the exemplary embodiment described herein employs the hard disk 730, other types of computer-readable media which can store data that are accessible by a computer, such as magnetic cassettes, flash memory cards, digital versatile disks, cartridges, random access memories (RAMs) 725, and read only memory (ROM) 720, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 745 represents any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems enable a user to provide multiple types of input to communicate with the computing device 700. The communications interface 740 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 710. The functions these blocks represent may be provided through the use of either shared or dedicated hardware, including, but not limited to, hardware capable of executing software and hardware, such as a processor 710, that is purpose-built to operate as an equivalent to software executing on a general purpose processor. For example the functions of one or more processors presented in FIG. 7 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 720 for storing software performing the operations described below, and random access memory (RAM) 725 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 7 can practice all or part of the recited methods, can be a part of the recited systems, and/or can operate according to instructions in the recited tangible computer-readable storage media. Such logical operations can be implemented as modules configured to control the processor 710 to perform particular functions according to the programming of the module. For example, FIG. 7 illustrates three modules Mod1 732, Mod2 734 and Mod3 736 which are modules configured to control the processor 710. These modules may be stored on the storage device 730 and loaded into RAM 725 or memory 715 at runtime or may be stored in other computer-readable memory locations.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to all network types provided the network elements can communicate alarms to a server or other platform acting as an Auto Repair Tool. Various modifications and changes may be made to the principles described herein without following the example embodiments and applications illustrated and described herein, and without departing from the spirit and scope of the disclosure.

We claim:

1. A method comprising:
retrieving, by a network element management system (NEMS), a circuit design of a telecommunications network from an Inventory Service (IS) database, the circuit design setting forth a circuit to be initiated on the telecommunications network;
decomposing, by the NEMS, the circuit design that was retrieved from the IS database to identify a network element of the telecommunications network included in the circuit design, wherein the network element includes at least a first port and a second port;
in response to identifying the network element, requesting operational information from the network element;
receiving, by the NEMS, the operational information from the network element;
storing the operational information in a second database, wherein the operational information from the network element comprises an operational configuration and operational state of the first port and the second port of the network element, and wherein the operational state includes identification of any port to which the first port or the second port is connected; and
establishing, based on the operational information, a cross-connect on the network element between the first port and the second port to complete at least a portion of the circuit set forth in the circuit design.

2. The method of claim 1 wherein the operational state of the first port and the second port indicates the interconnectivity of the first port and the second port.

3. The method of claim 2 further comprising transmitting a successful connection indicator to a network administrator if the first port and the second port are connected as described in the circuit design.

4. The method of claim 2 further comprising transmitting a failed connection indicator to a network administrator if the first port and the second port are not connected as described in the circuit design.

5. The method of claim 1 wherein the operational state of the first port and the second port indicates a port rate of each of the first port and the second port.

6. The method of claim 5 further comprising configuring the first port and the second port when the port rate of the first port and the second port are the same.

7. The method of claim 5 wherein the port rate of the first port is T1 and the port rate of the second port is T3.

8. The method of claim 6 further comprising disconnecting the cross-connect on the network element between the first port and the second port.

9. The method of claim 8 further comprising reconfiguring the first port and the second port after disconnecting the cross-connect on the network element between the first port and the second port.

10. The method of claim 1 further comprising transmitting a response to a service request after establishing the cross-connect on the network element between the first port and the second port.

11. A telecommunications network device comprising:
a processor; and
a non-transitory computer-readable storage medium having instructions stored which, when executed by the processor, causes the processor to perform operations comprising:
obtaining, by the device, a circuit design for providing one or more services to a customer of a telecommunications network, the circuit design obtained from storage and setting forth a circuit to be initiated on the telecommunications network;
analyzing, by the device, the circuit design to identify a network element of the telecommunications network included in the circuit design, wherein the network element includes at least a first port and a second port;
requesting, by the device, in response to identifying the network element, operational information from the network element;
receiving, by the device, the operational information from the network element;
storing the operational information in a second database, wherein the operational information from the network element comprises an operational configuration and operational state of the first port and the second port of the network element, and wherein the operational state includes identification of any port to which the first port or the second port is connected; and
establishing, based on the operational information, a cross-connect on the network element between the first port and the second port to complete at least a portion of the circuit set forth in the circuit design.

12. The system of claim 11 wherein the operational state of the first port and the second port indicates the interconnectivity of the first port and the second port.

13. The system of claim 12 wherein the processor further performs the operation of transmitting a successful connection indicator to a network administrator if the first port and the second port are connected as described in the circuit design.

14. The system of claim 12 wherein the processor further performs the operation of transmitting a failed connection indicator to a network administrator if the first port and the second port are not connected as described in the circuit design.

15. The system of claim 11 wherein the operational state of the first port and the second port indicates a port rate of each of the first port and the second port.

16. The system of claim 15 wherein the processor further performs the operation of configuring the first port and the second port when the port rate of the first port and the second port are the same.

17. The system of claim 15 wherein the port rate of the first port is T1 and the port rate of the second port is T3.

18. The system of claim 16 wherein the processor further performs the operation of disconnecting the cross-connect on the network element between the first port and the second port.

19. The system of claim 18 wherein the processor further performs the operation of reconfiguring the first port and the second port after disconnecting the cross-connect on the network element between the first port and the second port.

20. The system of claim 11 wherein the processor further performs the operation of transmitting a response to a service request after establishing the cross-connect on the network element between the first port and the second port.

* * * * *